United States Patent [19]

Lambertus

[11] 4,321,026
[45] Mar. 23, 1982

[54] DEVICE FOR GRANULATING PLASTIC STRANDS

[75] Inventor: Friedrich Lambertus, Stuttgart, Fed. Rep. of Germany

[73] Assignee: Werner & Pfleiderer, Stuttgart, Fed. Rep. of Germany

[21] Appl. No.: 22,444

[22] Filed: Mar. 21, 1979

[30] Foreign Application Priority Data

Apr. 1, 1978 [DE] Fed. Rep. of Germany ....... 2814113

[51] Int. Cl.³ ............................................. B29B 1/03
[52] U.S. Cl. .................................. 425/142; 425/161; 425/313
[58] Field of Search ............... 425/461, 161, 135, 142, 425/382.2, 464, 313; 264/141, 142

[56] References Cited

U.S. PATENT DOCUMENTS

| | | | |
|---|---|---|---|
| 2,436,201 | 2/1948 | Cole | 425/311 |
| 2,918,701 | 12/1959 | Hull et al. | 264/142 |
| 3,436,449 | 4/1969 | Trey et al. | 264/142 |
| 3,516,120 | 6/1970 | Braun et al. | 425/311 |
| 3,685,751 | 8/1972 | Anders | 425/311 |
| 3,792,950 | 2/1974 | Cuff | 425/313 |
| 3,867,082 | 2/1975 | Lambertus | 425/382.2 |
| 3,888,610 | 6/1975 | Brackmann et al. | 425/72 S |
| 3,920,362 | 11/1975 | Bradt | 425/72 S |
| 3,942,723 | 3/1976 | Langdon | 425/72 S |
| 3,954,361 | 5/1976 | Page | 425/72 S |
| 3,985,481 | 10/1976 | Brackmann et al. | 425/72 S |
| 4,112,039 | 9/1978 | Cuff | 264/142 |

FOREIGN PATENT DOCUMENTS

| | | |
|---|---|---|
| 1937862 | 2/1971 | Fed. Rep. of Germany ...... 264/141 |
| 814803 | 6/1959 | United Kingdom . |
| 880055 | 10/1961 | United Kingdom . |
| 1108875 | 4/1968 | United Kingdom . |
| 1306979 | 2/1973 | United Kingdom . |
| 1377980 | 12/1974 | United Kingdom . |
| 552202 | 4/1977 | U.S.S.R. ............................... 425/313 |

OTHER PUBLICATIONS

Publication—Modern Plastics—2/77.

*Primary Examiner*—Jay H. Woo
*Attorney, Agent, or Firm*—Hane, Roberts, Spiecens & Cohen

[57] ABSTRACT

A device for granulating plastic strands includes an extruder having a nozzle plate with boreholes arranged in front of a manifold and a starting valve connected thereto, and a cutting device with a knife head arranged centrally in a receiving housing wherein the cutting knives of the knife head rotate in the region of emergence of plastic strands which are acted on radially by a coolant. The cooling is accomplished by providing a cutting plate with cooling boreholes aligned axially with the nozzle boreholes of the nozzle plate. These cooling boreholes extend up to an insulating layer except for a recess which is connected to a coolant feed-line for releasing at least one flow cross section of coolant which corresponds to the cooling boreholes.

10 Claims, 4 Drawing Figures

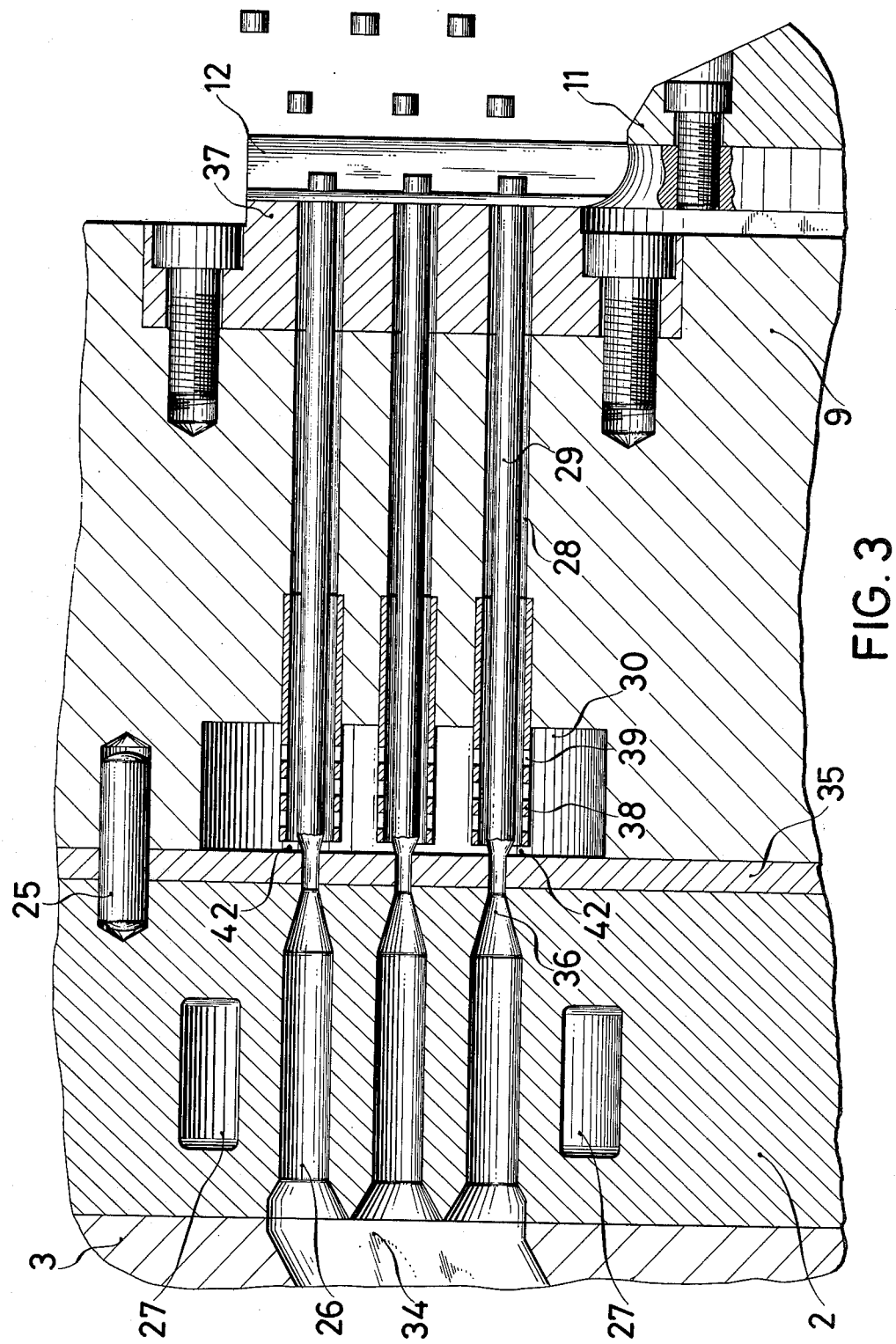

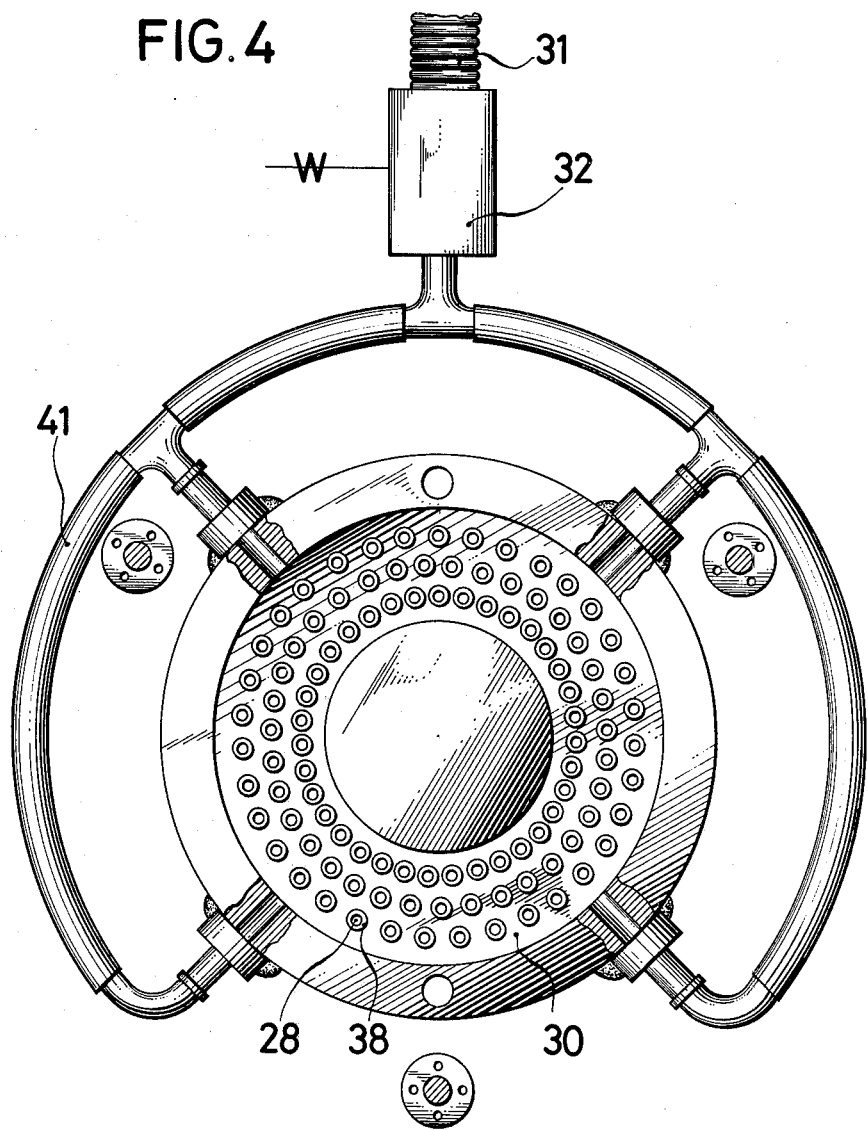

DEVICE FOR GRANULATING PLASTIC STRANDS

BACKGROUND OF THE INVENTION

This invention pertains to apparatus for granulating plastic strands.

The granulating of plastic strands by means of cutting knives immediately upon the emergence of the strand, referred to, as such, also as head granulation, requires a sensitive temperature control of the plastic strands within the nozzle plate all the way to the outlet for the strand. The temperature control must be adapted to retain the desired or predetermined viscosity of the individual molten strands up to their place of emergence, an increase in viscosity upon the emergence of the strand being necessary in order to obtain optimum cutting conditions.

In known granulating devices, this temperature control is obtained essentially by a corresponding addition of heat within the nozzle plate or by special insulating measures on the nozzles, or by the direct use of a coolant in the region of emergence of the plastic strands.

The processing of certain plastics which have a narrow softening range between the liquid and solid states, as is true, for instance, of polyamides and polyesters, requires a precise cooling of the plastic strands for the cutting process, without impairing the temperature conditions in the nozzle plate.

U.S. Pat. No. 3,792,950 shows a granulating device of the type indicated in which nozzle inserts, formed of porous material, in the nozzle plate directly adjoin the conically tapering inlet channel of the nozzle bore and are each individually surrounded by an annular channel for the introduction of a coolant into the nozzle bore.

Since in this case heat is removed by the action of the coolant on the inlet-channel insert, this action must be counteracted again by sufficient heating of each individual inlet channel insert by a suitable arrangement of heating channels. Thus, a large radial separation of the nozzle boreholes is required. Furthermore, the fine-pore nozzle inserts very easily become clogged, so that only carefully filtered pressurized water can be used, which means a high expense, in addition to which the water pressure thereof must be adapted to the melting pressure in the feed region.

SUMMARY OF THE INVENTION

An object of the present invention is to remedy the above-mentioned drawback and to provide granulating device of the aforementioned type in which the strand outlet nozzles are separated from the region surrounding the coolant feed which is necessary in order to obtain suitable cutting conditions, which device while spatially limited in size, after the emergence of the strand makes possible a precise lowering of the temperature of the molten strands without affecting the temperature thereof within the nozzle boreholes.

This goal is achieved in accordance with the invention by means of the features set forth in the main claim.

The connection of the nozzle plate with the cutting plate with the inclusion of the highly effective insulation and the supplementation of the nozzle boreholes by means of special cooling channels developed for cooling purposes makes possible a direct limitation of the length of the calibrated outlet nozzles. The cooling of the plastic strands thus takes place within a limited region of the cutting plate, in such a manner that the nozzle plate is substantially protected against heat losses by the coolant. The extrusion pressure of the extruder is also better utilized and an increase in the extrusion capacity is obtained. Furthermore, granulates having the smallest particle diameter can be obtained hereby without great expense.

The heat insulation required for the reducing of heat losses on the face-side of the nozzle plate is contained completely outside the sphere of action of the cutting knives and permits an extensive screening of the nozzle plate from the influence of the coolant and the structural parts acted on by the latter. It serves exclusively for the purpose of heat insulation. The end surface of the cutting plate which is passed over by the cutting knives, on the other hand, is provided, without any special heat-insulating measures, merely with a wear-protection layer or with special wear inserts. The coolant used can be introduced practically without pressure into the cooling channels. Nor is any special preparation of the coolant necessary.

With an embodiment of the granulating device in accordance with the features of the invention it is possible in simple manner at any time to control the nozzle outlet region. By displacement of the cutting plate together with the knife head and the collection housing, a check-up and cleaning of the nozzle mouth of the outlet nozzles and possibly of the cooling channels in the cutting plate can easily be effected at the start of an extrusion process as well as upon a change in the material being processed. The proposed development furthermore makes it possible to automate the placing in operation of the granulating device, this being achieved in accordance with another feature of the invention.

Another feature of the invention promotes the rapid placing in operation of the device by a rapid and dependable connection of the cutting plate with the nozzle plate. The guiding of the plastic strands within the cooling boreholes is favored in a special manner by further features of the invention.

The stream of coolant which enters directly via the annular gap into the coolant boreholes and as well as the stream introduced over the periphery of these boreholes makes possible a high velocity of flow of the coolant without any constrictions in or tearing apart of the plastic strands taking place. When water is used as a coolant, a velocity of flow which is up to 10 times greater than the velocity of emergence of the strand can be obtained in this way. The formation and growth of vapor bubbles on the surface of the strand is effectively prevented in this manner.

Still further features of the invention make possible a stretch-free guidance of the plastic strands even in the event of a high velocity of flow of the coolant.

Finally yet another feature of the invention gives assurance that upon the placing in operation the granulating device of the time-coordinated sequence of the steps to be carried out can be accurately maintained.

BRIEF SUMMARY OF THE DRAWING

The invention is described below based on an illustrative embodiment shown in the drawing, in which:

FIG. 3 is a portion of a vertical longitudinal section through the nozzle plate and the cutting plate of FIG. 1, shown on a larger scale; and FIG. 4 is a sectional view of the granulating device taken along the line IV—IV in FIG. 2.

DESCRIPTION OF THE PREFERRED EMBODIMENT

Figure 1:
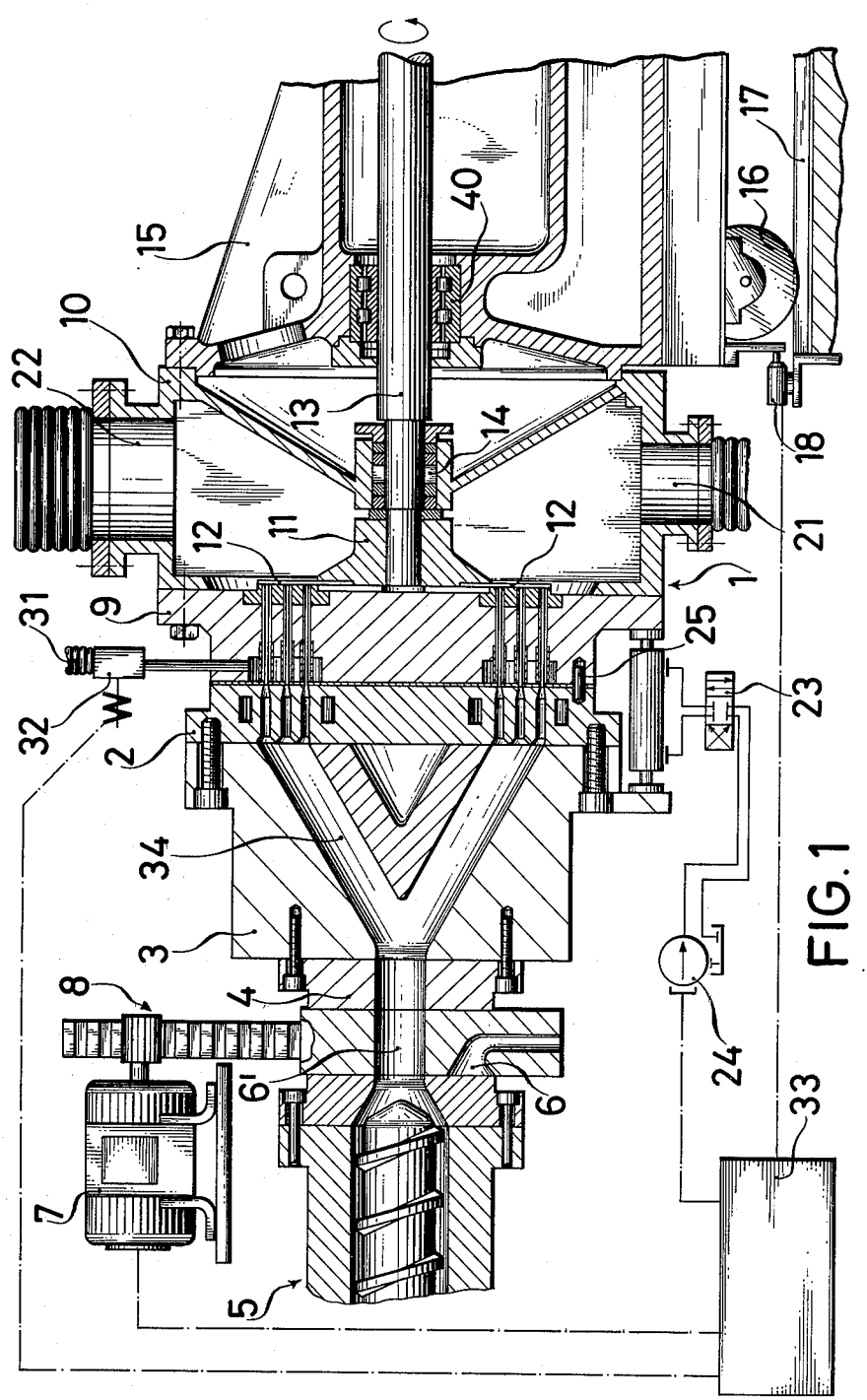
FIG. 1 is a vertical longitudinal section through a granulating device in accordance with the invention, shown connected in operating condition with a screw extruder.

The granulating device 1 shown in FIG. 1 is connected with its associated nozzle plate 2 via a manifold member 3 and a starting valve 4 to the screw extruder 5. The starting valve has two passages, one passage 6 extending into the atmosphere and the second passage 6' producing the connection with the nozzle plate 2. The actuating of the starting valve 4 is effected via a variable electric motor 7 and a gearing 8.

The granulating device 1 further includes a cutting plate 9 which connects a fully enclosed collection housing 10 to the nozzle plate 2, and a knife head 11 arranged centrally in the collection housing 10 and provided with a plurality of cutting knives 12.

The collection housing 10 has a connection 21 to the permanent water supply and a connection 22 for the removal of the cut granulate particles together with the conveying and cooling water introduced. The knife head 11 is connected with a drive shaft 13 which enters into the collection housing 10, which is sealed off by gaskets 14. The drive shaft 13 is guided in a bearing 40 which is located on a movable frame 15 to which the collection housing 10 is connected.

Figure 2:
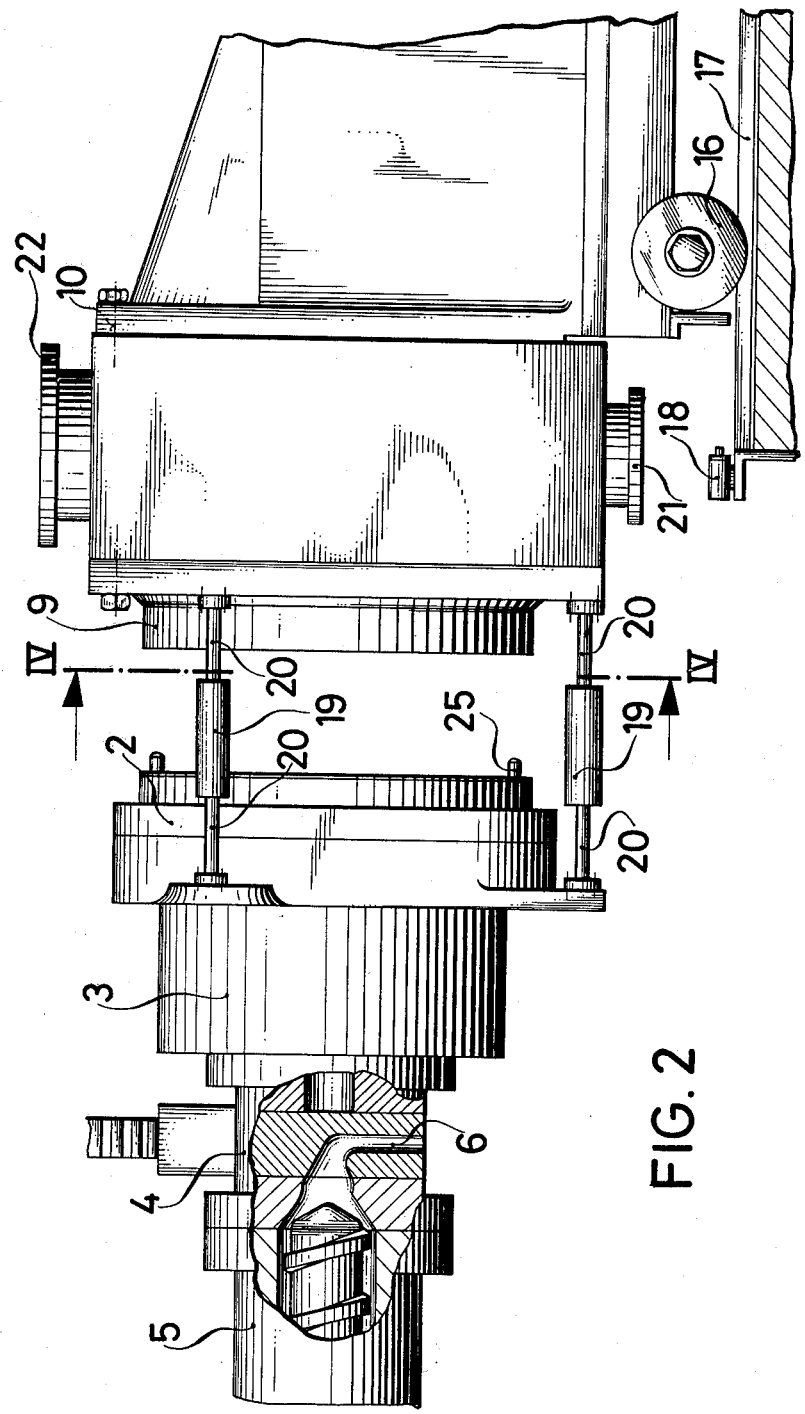
FIG. 2 shows the granulating device of FIG. 1 in front view, with the cutting plate and nozzle plate separated.

By displacing the frame 15 which is movable via rollers 16 on rails 17, the cutting plate 9 can be moved away from the nozzle plate 2 in order to provide free access and brought into the position shown in FIG. 2.

This moving of the cutting plate 9 from the nozzle plate 2 is obtained by a plurality of telescopic cylinders 19 (FIG. 2) which can be actuated hydraulically or pneumatically via a switch means 33, the cylinders being connected via a control valve 23 with a source of pressure fluid 24. The piston rods 20 of each telescopic cylinder 19, which rods are fastened to the outer periphery of the nozzle plate 2 and the cutting plate 9, make possible a uniform movement of displacement of the cutting plate 9. The adjusting of the nozzle plate 2 and of the cutting plate 9 is effected via setting pins 25.

A limit switch 18 serves to produce a pulse for special sequential operations which will be explained further below.

Upon transfer to the operating position shown in FIG. 2, a change-over valve is previously actuated so that the passageway 6 thereof which leads into the atmosphere is connected with the outside opening of the screw extruder 5.

The construction of the nozzle plate 2 and of the cutting plate 9 is shown in further detail in FIG. 3.

The nozzle plate 2 has a number of nozzle boreholes 26 arranged on circles concentric to its longitudinal axis and surrounded by heating channels 27 in order to make up for radially discharging heat losses. The nozzle boreholes 26 which are connected on the inlet side to a manifold 34 and narrow down on the outlet side discharge directly into cooling boreholes 28 whose diameter is greater than the diameter of the plastic strand 29 guided therein. These cooling boreholes 28 which are arranged in the cutting plate 9 and are aligned with the nozzle boreholes 26 lead directly into the collecting housing 10. They are surrounded on the inlet side by a recess 30 which serves for the feeding of a coolant and is connected with a supply line 31 for the coolant. The feeding of the coolant is effected via a solenoid valve 32 (FIGS. 1 and 4) which is controlled by an electric switching device 33. The introduction of the stream of coolant into the cooling borehole 28 takes place via an annular gap 42 formed between the guide sleeves 38 and the surface of an insulating layer 35.

This stream of coolant can, however, also be introduced into the cooling boreholes 28, exclusively or in addition, via inlet openings 39 arranged in the region of the recess 30 in the guide sleeves 38.

The coolant which flows into the cooling boreholes transports and thereby cools the plastic strand 29 immediately upon its emergence from the nozzles 36. In this way, an action which centers the plastic strands is obtained by the passage opening 42 and the plurality of inlet openings 39. The cutting plate therefore has a multiple function. It not only makes possible a precise separation of the hot-melt region from the collection housing 10 which is continuously traversed by a relatively large quantity of cooling water, but it also assures a precise guidance of separately cooled plastic strands into the collection housing 10.

Between the nozzle plate 2 and the cutting plate 9 is insulating layer 35 which covers the end surfaces of both plates to such an extent that merely the cross section of passage of the outlet nozzles 36 of the nozzle boreholes 26 remains free. The insulating layer 35 is subjected solely to thermal stresses and can consist, for instance, of zirconia which is insensitive to wear and assures good heat insulation. Development of the insulating layer 35 by means of bushings in the outlet region of the nozzles 36 is not necessary in this case.

The cutting plate 9 is provided in the region of the outlet side of its cooling boreholes 28 with a wear-resistant insert 37. Insulating measures are not required in this region since the insulating layer 35 is present between the cutting plate 9 and the nozzle plate 2.

The outlet region of the cutting plate 9 is thus not subjected to any great changes in temperature, so that the insert 37 may also be formed of materials of low resistance to changes of temperature and of a thermal expansion which differs from that of the material of the cutting plate 9. The guiding of the plastic strands which is effected within the cooling boreholes 28 by means of a coolant, for instance water, makes possible a precise guiding of such strands up into the region of the path of the cutting knives 12. The cutting knives need not extend all the way up to the front side of the insert 37. The cutting of the plastic strands at a distance from these inserts thus makes possible considerable increases in the life of the cutting knives 12.

FIG. 4 shows the arrangement of the cooling boreholes 28 in the region of the annular recess 30. The feeding of the coolant into this recess 30 and thus into the cooling boreholes 28 is effected via a ring conduit 41 which is in communication with the solenoid valve 32 and the supply line 31. The feeding of the water is effected with a velocity of flow which is higher than the velocity of emergence of the plastic strands in order to counteract any formation of vapor bubbles along the plastic strands. The granulating device is particularly suitable for granulating plastics which have a narrow softening range. Such plastics are, for instance, polyamides and polyesters, whose viscosity changes rapidly as a function of the temperature and which therefore customarily mean a high expense for control of the temperature in the region of the nozzle plates.

The molten plastic strands emerging from the nozzle boreholes 26 pass in each case into a narrow stream of coolant which is adapted to the velocity of emergence of the strand. This stream of coolant cools the plastic strands uniformly and transports them into the cutting region of the cutting knives. The transformation of the molten strands from molten state to the highly viscous cuttable state therefore does not take place immediately upon the emergence of the strand from the nozzle boreholes but during the transportation through the coolant boreholes. The transport fluid—preferably water—surrounds the plastic strands and cools them as a whole only to the extent necessary in order to obtain optimum cutting conditions. The degree of cooling is determined here by the temperature and the velocity of flow of the water. These parameters, which are dependent on the plastic being worked, can be determined by simple experiment.

When the granulating device is placed in operation, the nozzle plate 2 and cutting plate 9 are first of all separated from each other so that the nozzle boreholes 26 are initially free, as is shown in FIG. 2.

After a pulse is produced manually via the switching device 33, there is a brief transfer of the starting valve 4 into the position shown in FIG. 1. After the nozzle boreholes 26 have been filled with plastic and the transfer between the nozzle plate 2 and the cutting plate 9 is freed of any adherent molten material, the actual starting process commences. In this connection the extruder is first of all turned on and brought to the desired through-put. The melt in this connection flows for a short time over the starting valve 4 onto the floor in accordance with the operating position shown in FIG. 2. By the connecting of the source of pressure fluid 24 the cutting plate 9 is then drawn by the telescopic cylinders 19 against the nozzle plate 2. In this way, the limit switch 18 is actuated and the pulse formed thereby brings about, via the switching device 33, a movement of displacement of the starting valve 4 and an opening of the solenoid valve 32 so that the cooling boreholes 28 are traversed, with entrance of strand, by the cooling water.

By the production of this pulse there is further effected the actuating of a circulating pump (not shown) which circulates the transport water which is introduced into the collection housing 10 via the connection 21 and discharged via the connection 22, this water serving for the conveying of the granulate.

EXAMPLE OF OPERATION OF THE SYSTEM

For processing there was used polypropylene which was delivered at a melt temperature of 280° C. from the nozzle boreholes of the nozzle plate.

The speed of removal of the strands is 9.25 meters/second with a diameter of the plastic strand of 4 mm, so that a through-put of 10 kg/hour was obtained.

With a thickness of the cutting plate of 120 mm, there was obtained a time of stay in the cooling boreholes of 0.5 seconds. Under these conditions and with a water temperature of about 60° C. within cooling boreholes of 9 mm and a velocity of flow of the water of 2.5 meters/second, the surface of the strand in the cutting region of the cutting knives was cooled to about 100° C. The temperature in the center of the strand was 200° C.

With about 10 times greater velocity of flow of the water as compared with the given velocity of withdrawal of the strand it was possible, with sufficient cooling of the strand, still to obtain a stretch-free but sufficiently centered guiding of the strand. Higher velocities of flow of the cooling water lead to undesired reductions in area and subsequently to the tearing of the strand.

The centering of the plastic strands within the cooling boreholes is obtained by the special arrangement of the guide sleeves 38 which permit the entrance of the cooling water through annular slot 42 formed between the guide sleeves 38 and the insulating layer 35. In this case, the width of the annular slot can amount preferably to 0.5 to 3 mm.

The inlet openings 39 provided in the guide sleeves also favor the centering of the strand and permit a flutter-free guidance of the strand in the cooling boreholes.

The granulating device can be used not only in combination with a collecting hood which is traversed by water but also with the same success with the use of a so-called water-ring hood. With a water-ring hood, the mixture of granulate and water which is removed by the cutting knives is taken up, with the utilization of the existing centripetal forces, by a water ring rotating in the hood. If instead of using water as coolant agent a gaseous coolant agent is employed, for instance air, an interceptor hood can also be used.

While only one embodiment of the invention has been shown and described in detail there will now be obvious to the skilled in the art many modifications and variations satisfying many or all of the objects of the invention without departing from the spirit thereof as defined by the appended claims.

What is claimed is:

1. In a device for granulating plastic strands having a nozzle plate with boreholes arranged in front of a manifold and a starting valve, connected with the latter, of an extruder, and a cutting device with knife head, arranged centrally in a receiving housing, the cutting knives of the knife head rotating in the region of emergence of plastic strands which are acted on radially by a coolant, the improvement comprising a removable cutting plate and an insulating layer disposed between the nozzle plate and the cutting plate, said cutting plate being provided with cooling boreholes aligned axially with the nozzle boreholes of the nozzle plate and extending up to said insulating layer, an annular recess surrounding a portion of said cooling boreholes and in communication therewith, a feed line connected to said recess to supply coolant thereto and thereby to the cooling boreholes, said cutting plate being connected to said receiving housing to form a unitary structure with said receiving housing and the knife head, and drive means for selectively displacing said unitary structure with the cutting plate and said nozzle plate between separated and engaged positions.

2. A device according to claim 1 further comprising means supporting said unitary structure for movement in a longitudinal direction of the nozzle boreholes in response to the action of said drive means.

3. A device according to claim 2 further comprising a frame for said unitary structure and wherein said supporting means includes rollers on rails and further comprising a limit switch means at the end of the path of travel of said structure for giving indication of the engagement of said cutting plate and nozzle plate.

4. A device according to claims 1, 2 or 3 wherein said drive means comprises telescopic cylinder means which is fastened to the outer periphery of said knife head and to the outer periphery of the nozzle plate.

5. A device according to claim 1 wherein the said cooling boreholes in the region of said recess are formed with guide sleeves provided with a plurality of radial inlet openings and extending in proximity to said insulating layer.

6. A device according to claim 5 wherein there is an annular gap between said insulating layer and the ends of said guide sleeves for entry of coolant into said guide sleeves.

7. A device according to claim 3 wherein the starting valve is provided with a drive unit, said feed line being provided with a solenoid valve and further comprising a switch means responsive to said limit switch means for controlling said starting valve and said solenoid valve.

8. A device according to claim 1 wherein said nozzle plate and cutting plate are relatively movable in a direction parallel to the boreholes in said plates and include guide means for aligning the plates in the engaged positions.

9. A device according to claim 7 wherein said starting valve has two spaced passages, one for directing extruded plastic material to said manifold and a second for discharging extruded plastic material directly to the ambient atmosphere, said drive unit acting to selectively place said passages in communication with the extruder under the control of said switch means in response to the condition of engagement or disengagement of said nozzle plate and cutting plate.

10. A device according to claim 1 wherein said insulating layer is provided with holes aligned axially with the boreholes in the cooling plate and the boreholes in the nozzle plate.

* * * * *